(12) United States Patent
Miller

(10) Patent No.: US 9,962,672 B1
(45) Date of Patent: May 8, 2018

(54) REACTOR COMPONENT PLACEMENT INSIDE LINER WALL

(71) Applicant: REC Silicon Inc, Moses Lake, WA (US)

(72) Inventor: Matthew J. Miller, Moses Lake, WA (US)

(73) Assignee: REC Silicon Inc, Moses Lake, WA (US)

( * ) Notice: Subject to any disclaimer, the term of this patent is extended or adjusted under 35 U.S.C. 154(b) by 24 days.

(21) Appl. No.: 15/347,208

(22) Filed: Nov. 9, 2016

(51) Int. Cl.
| | |
|---|---|
| *B01J 8/00* | (2006.01) |
| *B01J 8/18* | (2006.01) |
| *B01J 8/24* | (2006.01) |
| *B01J 19/00* | (2006.01) |
| *B01J 19/24* | (2006.01) |

(52) U.S. Cl.
CPC ........... *B01J 8/1872* (2013.01); *B01J 8/1836* (2013.01); *B01J 8/24* (2013.01); *B01J 2208/00168* (2013.01); *B01J 2208/00796* (2013.01)

(58) Field of Classification Search
CPC ..... B01J 8/00; B01J 8/18; B01J 8/1836; B01J 8/1872; B01J 8/24; B01J 19/00; B01J 19/24; B01J 2208/00–2208/00017; B01J 2208/00106; B01J 2208/00168; B01J 2208/00796

See application file for complete search history.

(56) References Cited

U.S. PATENT DOCUMENTS

| | | | |
|---|---|---|---|
| 8,075,692 B2 * | 12/2011 | Osborne | ................. C23C 16/24 118/715 |
| 8,535,614 B2 | 9/2013 | Chu | |
| 9,238,211 B1 | 1/2016 | Osborne et al. | |
| 9,254,470 B1 | 2/2016 | Spangler et al. | |
| 9,446,367 B2 | 9/2016 | Miller et al. | |
| 2007/0137794 A1 | 6/2007 | Qui et al. | |
| 2012/0263874 A1 | 10/2012 | Osborne et al. | |
| 2014/0123896 A1 * | 5/2014 | Miller | ................... C23C 16/442 118/712 |
| 2016/0045878 A1 | 2/2016 | Yilmaz et al. | |
| 2016/0045881 A1 | 2/2016 | Spangler et al. | |

FOREIGN PATENT DOCUMENTS

| | | |
|---|---|---|
| KR | 10-0515777 B1 | 9/2005 |
| KR | 10-2016-0108595 A | 9/2016 |
| WO | WO 2010/003093 A2 | 1/2010 |

OTHER PUBLICATIONS

World Intellectual Property Organization, International Search Report and Written Opinion, dated Feb. 13, 2018, issued in corresponding International Patent Application No. PCT/US2017/060219.

* cited by examiner

*Primary Examiner* — Natasha E Young

(74) *Attorney, Agent, or Firm* — Klarquist Sparkman, LLP

(57) ABSTRACT

Reaction chamber liners for use in a fluidized bed reactor for production of polysilicon-coated granulate material are disclosed. The liners include an aperture and a cavity configured to receive a reactor component, such as a probe, a sensor, a nozzle, a feed line, a sampling line, a heating/cooling component, or the like. In some embodiments, the liner is a segmented liner comprised of vertically stacked or laterally joined segments, wherein at least one segment includes an aperture and a cavity configured to receive a reactor component.

20 Claims, 13 Drawing Sheets

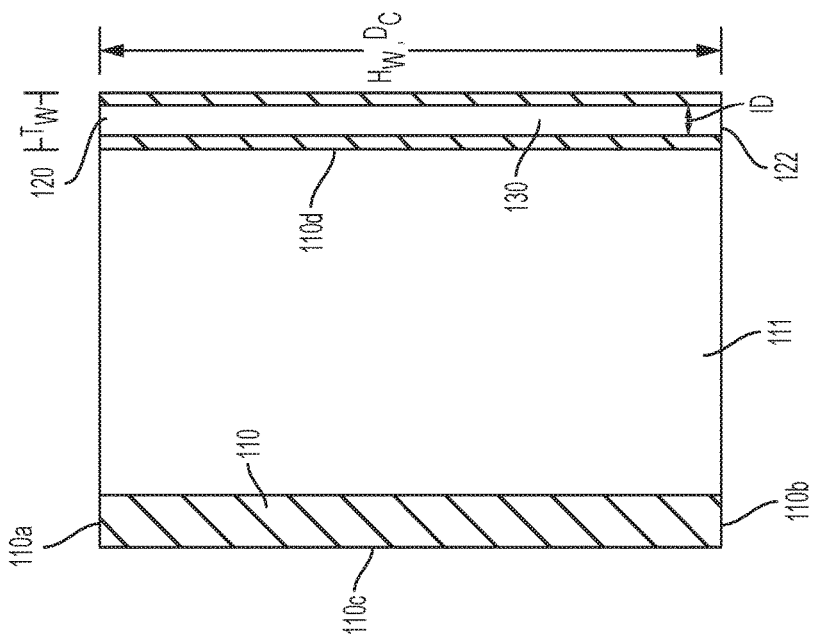
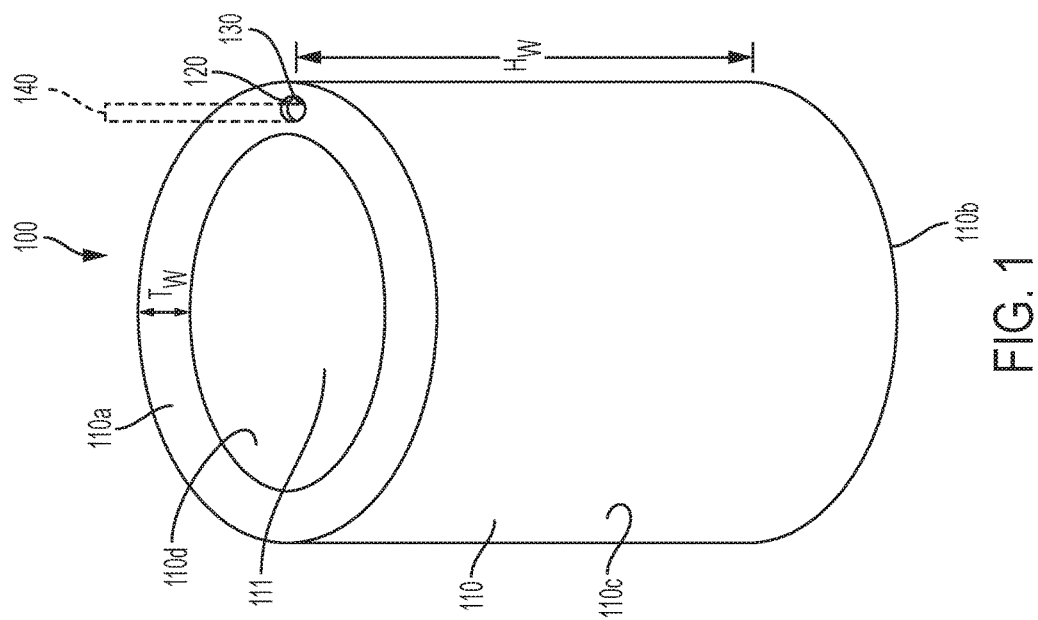

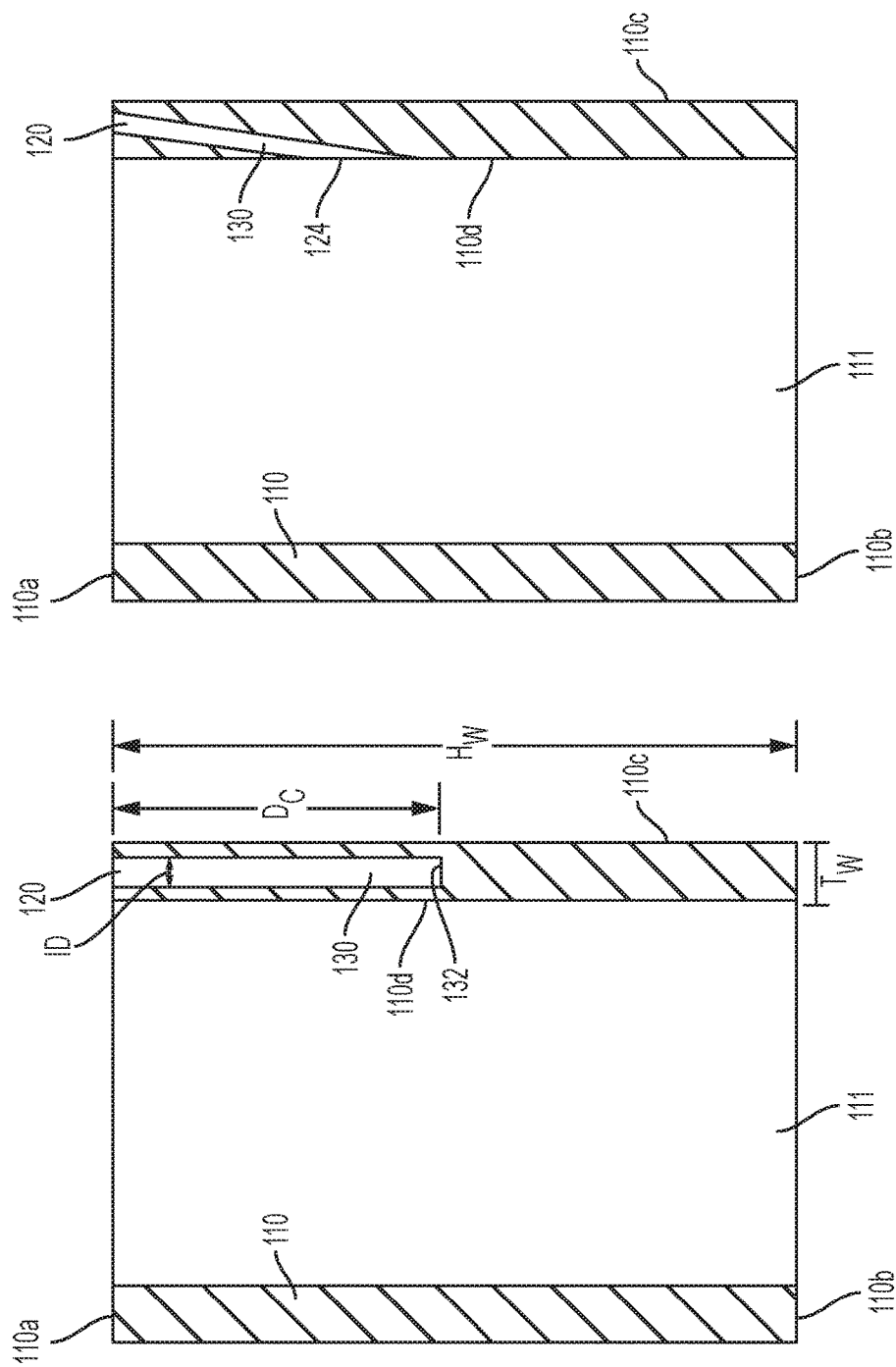

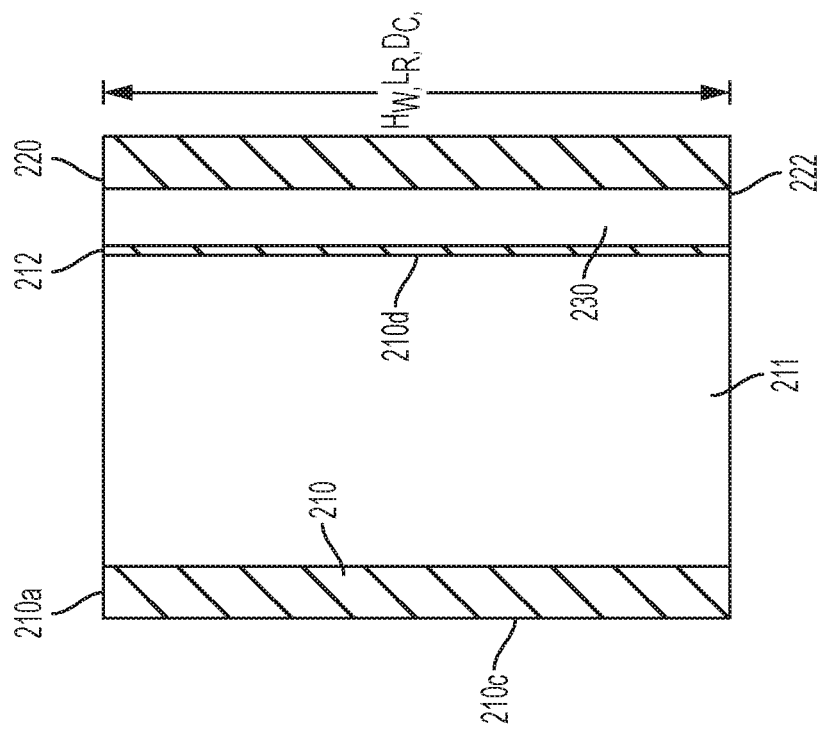
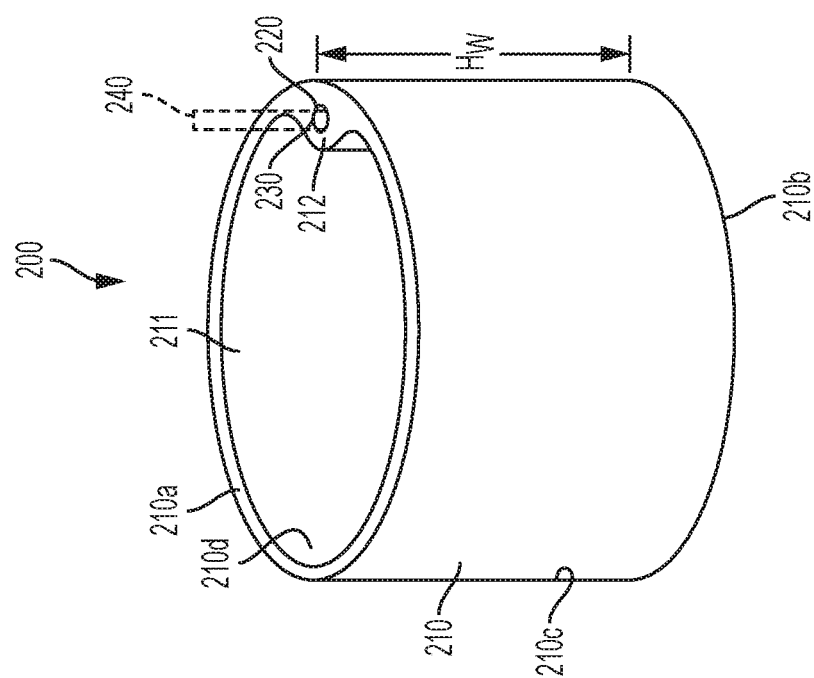
FIG. 6
FIG. 5

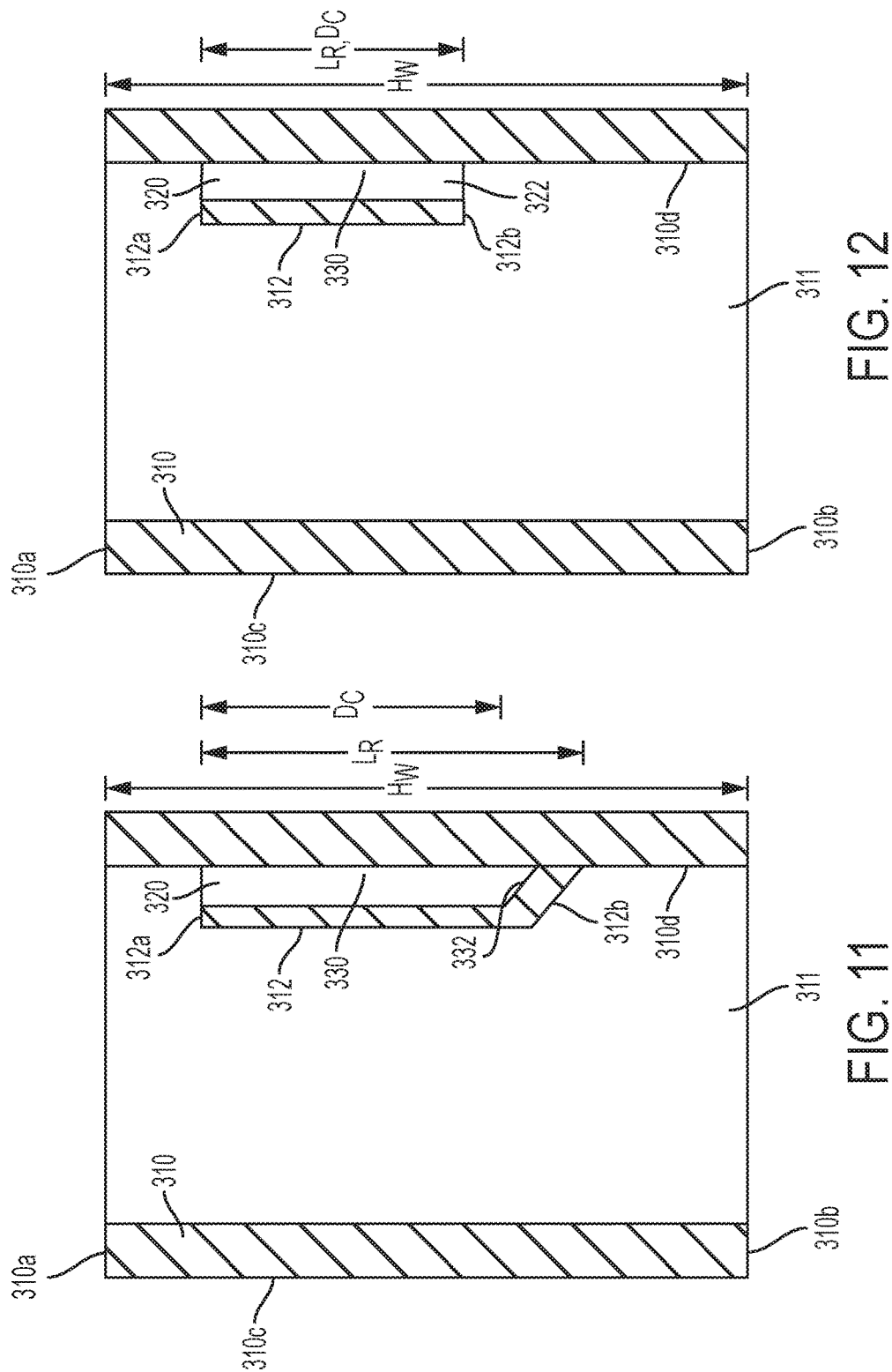

REACTOR COMPONENT PLACEMENT
INSIDE LINER WALL

FIELD

This disclosure concerns reaction chamber liners for use in a fluidized bed reactor for making polysilicon-coated granulate material.

BACKGROUND

Pyrolytic decomposition of silicon-bearing gas in fluidized beds is an attractive process for producing polysilicon for the photovoltaic and semiconductor industries due to excellent mass and heat transfer, increased surface for deposition, and continuous production. Compared with a Siemens-type reactor, the fluid bed reactor offers considerably higher production rates at a fraction of the energy consumption.

A common problem in fluid bed reactors is fouling of interior components as silicon deposits form on the walls, interior support structures, and interior reactor components including, but not limited to probes, sensors, nozzles, heating/cooling components, feed lines, and sampling lines. Another common problem is contamination of the fluid bed at high operating temperatures by materials used to construct the reactor and its interior components. For example, nickel has been shown to diffuse into a silicon layer from the base metal in some nickel alloys. Silicon-coated particles can be contaminated by the transferred metal. Galling also causes wear and tear of metal components, leading to reactor downtime as components are replaced or the metal surfaces are ground or machined to return them to condition for reuse. Similar problems arise in fluid bed reactors configured for pyrolytic decomposition of a germanium-bearing gas to produce germanium-coated particles. Thus, there is a need to reduce contamination of the product particles formed in a fluid bed reactor and/or reduce wear-and-tear of the reactor components.

SUMMARY

This disclosure concerns reaction chamber liners for use in fluidized bed reactors for making polysilicon-coated granulate material. A liner includes at least one aperture and cavity configured to receive a reactor component, such as a probe, a sensor, a nozzle, a feed line, a sampling line, a heating/cooling component, or the like.

In some embodiments, a reaction chamber liner includes a tubular wall having an upper surface, a lower surface, an outwardly facing surface, an inwardly facing surface configured to define a portion of a reaction chamber, a height $H_W$ between the upper surface and the lower surface, and a thickness $T_W$ between the outwardly facing surface and the inwardly facing surface. The tubular wall defines an upper aperture in the upper surface and a cavity that extends from the upper aperture toward the lower surface and that has a depth $D_C$. In one embodiment, the depth $D_C$ of the cavity is less than the height $H_W$ of the tubular wall. In an independent embodiment, the depth $D_C$ of the cavity is equal to the height $H_W$ of the tubular wall, and the tubular wall defines a lower aperture such that the cavity extends through the tubular wall from the upper aperture to the lower aperture. In any or all of the above embodiments, the tubular wall may be constructed of silicon carbide, graphite, quartz, silicon nitride, Si- or SiC-coated graphite, carbon fiber, or Si- or SiC-coated carbon fiber.

In some embodiments, the tubular wall comprises at least one inwardly projecting ridge that is defined by a portion of the inwardly facing surface of the tubular wall and by a corresponding portion of the upper surface, the ridge having a length $L_R$, wherein $L_R \leq H_W$. In such embodiments, the upper aperture is in the corresponding portion of the upper surface so that the cavity is positioned in the ridge. In one embodiment, the at least one inwardly projecting ridge is further defined by a corresponding portion of the lower surface of the tubular wall such that $L_R = H_W$; the tubular wall defines a lower aperture in the corresponding portion of the lower surface, and the depth $D_C$ of the cavity is equal to the length $L_R$ such that the cavity extends from the upper aperture through the ridge to the lower aperture. In certain embodiments, $L_R < H_W$, and (i) the depth of the cavity $D_C$ is less than the length $L_R$ of the ridge, or (ii) a lower surface of the ridge defines a lower aperture, and the depth of the cavity $D_C$ is equal to the length $L_R$ of the ridge such that the cavity defines a passageway extending from the upper aperture to the lower aperture.

In certain embodiments, a reaction chamber liner includes (i) a tubular wall having an upper surface, a lower surface, an outwardly facing surface, an inwardly facing surface configured to define a portion of a reaction chamber, and a height $H_W$ between the upper surface and the lower surface of the tubular wall; and (ii) at least one inwardly projecting ridge defined by a portion of the inwardly facing surface, the ridge having an upper surface, a lower surface and a length $L_R$ between the upper and lower surfaces of the ridge, wherein $L_R < H_W$. The upper surface of the ridge is below the upper surface of the tubular wall. The ridge defines an upper aperture in the upper surface of the ridge and a cavity that extends from the upper aperture into the ridge, the cavity having a depth $D_C$. In one embodiment, the depth $D_C$ of the cavity is less than the length $L_R$ of the ridge. In an independent embodiment, the depth $D_C$ of the cavity is equal to the length $L_R$ of the ridge and the lower surface of the ridge further defines a lower aperture, such that the cavity extends through the ridge from the upper aperture to the lower aperture.

In any or all of the above embodiments, the reaction chamber liner may be a segmented liner. In one embodiment, the segmented liner comprises a plurality of vertically stacked segments, and the tubular wall is one of the plurality of segments. In an independent embodiment, the tubular wall comprises a plurality of laterally joined segments, wherein a cavity is positioned in at least one of the laterally joined segments. In another independent embodiment, the segmented liner comprises a plurality of vertically stacked segments, and at least one of the vertically stacked segments is a tubular wall comprising a plurality of laterally joined segments, wherein the cavity is positioned in one of the laterally joined segments.

Embodiments of a fluidized bed reactor for production of polysilicon-coated granulate material include a vessel having an outer wall that at least partially defines an enclosed space and a reaction chamber liner as disclosed herein, the reaction chamber liner being positioned within the enclosed space inwardly of the outer wall with the inwardly facing surface of the tubular wall defining at least a portion of a reaction chamber. The fluidized bed reactor may further include (i) at least one heater positioned between the outer wall and the liner, (ii) at least one inlet having an opening positioned to admit a primary gas comprising a silicon-bearing gas into the reaction chamber, (iii) a plurality of fluidization gas inlets, wherein each fluidization gas inlet has an outlet opening into the reaction chamber, and (iv) at least one outlet for removing silicon-coated product particles from the vessel.

The foregoing and other features and advantages of the invention will become more apparent from the following detailed description, which proceeds with reference to the accompanying figures.

BRIEF DESCRIPTION OF THE DRAWINGS

FIG. 1 is a schematic oblique view of a reaction chamber liner comprising a tubular wall having an upper surface that defines an upper aperture and a cavity that extends downwardly from the aperture toward a lower surface of the tubular wall.

FIG. 2 is a schematic vertical cross-sectional view extending through the cavity of the liner of FIG. 1, wherein the cavity has a depth equal to the tubular wall height.

FIG. 3 is a schematic vertical cross-sectional view extending through the cavity of the liner of FIG. 1, wherein the cavity has a depth less than the tubular wall height.

FIGS. 4A and 4B are schematic vertical cross-sectional views extending through the cavity of the liner of FIG. 1, wherein an inwardly facing surface of the tubular wall defines an inwardly facing aperture and the cavity extends from the upper aperture to the inwardly facing aperture.

FIG. 5 is a schematic oblique view of a reaction chamber liner comprising a tubular wall comprising an inwardly projecting ridge defined by a portion of the inwardly facing surface of the tubular wall and by a corresponding portion of the upper surface of the tubular wall, wherein the upper surface of the tubular wall defines an upper aperture and a cavity that is positioned in the ridge.

FIG. 6 is a schematic vertical cross-sectional view extending through the cavity of the liner of FIG. 5, wherein the ridge has a height equal to the tubular wall height and the cavity has a depth equal to the tubular wall height.

FIG. 11 is a schematic vertical cross-sectional view extending through the cavity of the liner of FIG. 10, wherein the ridge has a height less than the height of the tubular wall, and the cavity has a depth less than the ridge height.

FIG. 12 is a schematic vertical cross-sectional view extending through the cavity of the liner of FIG. 10, wherein the ridge has a height less than the height of the tubular wall, and the cavity has a depth equal to the ridge height.

DETAILED DESCRIPTION

Figure 4B:
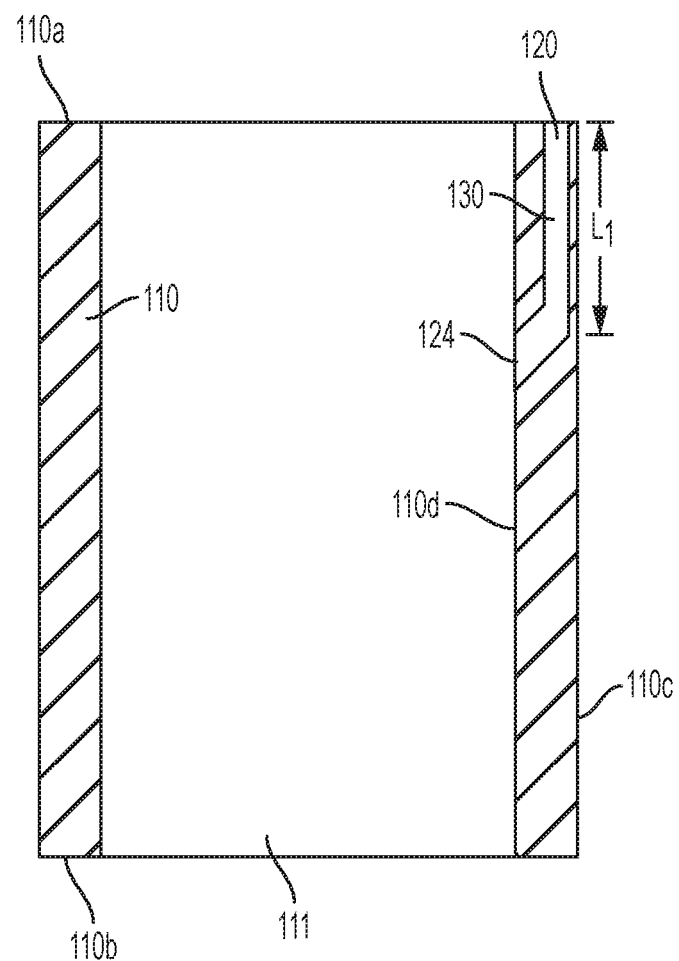

This disclosure concerns reaction chamber liners for use in a fluidized bed reactor for making polysilicon-coated granulate material, wherein a liner includes at least one aperture and cavity configured to receive a reactor component, such as a probe, a sensor, a nozzle, a feed line, a sampling line, a heating/cooling component, or the like.

A fluidized bed reactor (FBR) for making granular polysilicon may include a liner having an inwardly-facing surface that at least partially defines a reaction chamber. The liner prevents polysilicon granule contamination arising from reactor components positioned outside or within the liner. The liner is constructed of a non-contaminating material. Advantageously, the liner also protects and reduces wear-and-tear of the reactor components. The liner also may facilitate use of reactor components that would otherwise be unsuitable for exposure to conditions within the reaction chamber.

I. Definitions and Abbreviations

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, percentages, temperatures, times, and so forth, as used in the specification or claims are to be understood as being modified by the term "about." Accordingly, unless otherwise indicated, implicitly or explicitly, the numerical parameters set forth are approximations that may depend on the desired properties sought, limits of detection under standard test conditions/methods, or both. When directly and explicitly distinguishing embodiments from discussed prior art, the embodiment numbers are not approximates unless the word "about" is recited.

Unless otherwise indicated, all percentages referring to a composition or material are understood to be a percent by weight, i.e., % (w/w). For example, a composition comprising 2% lithium includes 2 g lithium per 100 g of the composition. Where expressly noted, percentages referring to a substance may be atomic percentages, i.e., the number of atoms per 100 atoms. For example, a substance comprising 1% atomic phosphorus includes one phosphorus atom per one hundred atoms in the substance. Similarly, concentrations expressed as parts per million (ppm) or parts per billion (ppb) are understood to be in terms of weight unless otherwise indicated, e.g., 1 ppm=1 mg/kg. Where expressly noted, concentrations may be expressed as ppma (ppm atomic) or ppba, e.g., 1 ppma=1 atom in 1,000,000 atoms.

In order to facilitate review of the various embodiments of the disclosure, the following explanations of specific terms are provided:

Acceptor: An atom capable of accepting an electron (p-type dopants), thus generating holes in the valence band of silicon atoms; acceptors include Group III elements, such as B, Al, Ga, also Be, Sc.

Atomic percent: The percent of atoms in a substance, i.e., the number of atoms of a particular element per 100 atoms of the substance.

Donor: An atom capable of donating an electron to serve as a charge carrier in the silicon carbide (n-type dopants); the remaining four electrons coordinate with silicon; donors include Group V elements, such as N, P, As; also Ti, Cr, Sb.

Dopant: An impurity introduced into a substance to modulate its properties; acceptor and donor elements replace elements in the crystal lattice of a material, e.g., a semiconductor.

Electronic-grade silicon: Electronic-grade, or semiconductor-grade, silicon has a purity of at least 99.99999 wt %, such as a purity from 99.9999-99.9999999 wt % silicon. Electronic-grade silicon typically includes ≤0.3 ppba B, ≤0.3 ppba P, ≤0.5 ppma C, <50 ppba bulk metals (e.g., Ti, Cr, Fe, Ni, Cu, Zn, Mo, Na, K, Ca), ≤20 ppbw surface metals, ≤8 ppbw Cr, ≤8 ppbw Ni, ≤8 ppba Na. In some instances, electronic-grade silicon includes ≤0.15 ppba B, ≤0.15 ppba P, ≤0.4 ppma C, ≤10 ppbw bulk metals, ≤0.8 ppbw surface metals, ≤0.2 ppbw Cr, ≤0.2 ppbw Ni, ≤0.2 ppba Na.

Foreign metal: As used herein, the term "foreign metal" refers to any metal or metalloid present in silicon carbide, other than silicon.

Mobile metal: As used herein, the term "mobile metal" refers to a metal atom or metal ion that may migrate out of a substance (e.g., out of silicon carbide) or vaporize at operating conditions of a fluidized bed reactor and contribute to product contamination. Mobile metals include Group IA metals, Group IIA metals, Group IIIA metals, transition metals, and cations thereof.

Reaction-bonded silicon carbide (RBSiC): Reaction-bonded silicon carbide may be produced by reacting porous carbon or graphite with molten silicon.

Alternatively, RBSiC may be formed by exposing a finely divided mixture of silicon carbide and carbon particles to liquid or vaporized silicon at high temperatures whereby the silicon reacts with the carbon to form additional silicon carbide, which bonds the original silicon carbide particles together. RBSiC often contains a molar excess of unreacted silicon, which fills spaces between silicon carbide particles, and may be referred to as "siliconized silicon carbide." In some processes, a plasticizer may be used during the manufacturing process and subsequently burned off.

Solar-grade silicon: Silicon having a purity of at least 99.999 wt % atomic. Furthermore, solar-grade silicon typically has specified concentrations of elements that affect solar performance. According to Semiconductor Equipment and Materials International (SEMI) standard PV017-0611, solar-grade silicon may be designated as grade I-IV. For example, Grade IV solar-grade silicon contains <1000 ppba acceptors (B, Al), <720 ppba donors (P, As, Sb), <100 ppma carbon, <200 ppba transition metals (Ti, Cr, Fe, Ni, Cu, Zn, Mo), and <4000 ppba alkali and earth alkali metals (Na, K, Ca). Grade I solar-grade silicon contains <1 ppba acceptors, <1 ppba donors, <0.3 ppma C, <10 ppba transition metals, and <10 ppba alkali and earth alkali metals.

Surface contamination: Surface contamination refers to contamination (i.e., undesired elements, ions, or compounds) within surface layers of a material, such as a silicon carbide segment. Surface layers include the outermost atomic or molecular layer of the material as well as atomic/molecular layers extending inwardly to a depth of 25 μm in the material. Surface contamination may be determined by any suitable method including, but not limited to, scanning electron microscopy, energy dispersive x-ray spectroscopy, or secondary ion mass spectrometry.

II. Reaction Chamber Liner

A fluidized bed reactor for production of silicon-coated particles includes a vessel having an outer wall that at least partially defines an enclosed space and a reaction chamber liner comprising a tubular wall positioned within the enclosed space inwardly of the outer wall with an inwardly facing surface of the tubular wall defining at least a portion of a reaction chamber. Conventionally, the tubular wall is of solid construction without cavities in the wall. One or more internal reactor components may be present within the reaction chamber, e.g., sensors, probes, and feed/sampling lines, among others.

Embodiments of the disclosed reaction chamber liners comprise a tubular wall including at least one aperture and cavity within the tubular wall. Advantageously, the aperture and cavity are configured to receive a reactor component. Exemplary reactor components include probes, sensors, nozzles, feed lines, sampling lines, heating/cooling components, and the like. The reactor component may be, for example, a seed nozzle, a thermocouple, a pressure tap, a particle sampling line, a gas sampling line, a gas feed line, a bed height measurement device (e.g., X-ray, gamma, etc.), a force probe, a heat exchanger, a velocity sensor, a spectroscopic probe, a radar probe, or an optical probe.

In some embodiments, as shown in FIGS. 1-4, a reaction chamber liner 100 comprises a tubular wall 110 having an upper surface 110a, a lower surface 110b, an outwardly facing surface 110c, and an inwardly facing surface 110d configured to define a bore 111 that is at least a portion of a reaction chamber. The tubular wall 110 has a height $H_W$ between the upper surface 110a and the lower surface 110b, and a thickness $T_W$ between the outwardly facing surface 110c and the inwardly facing surface 110d. The illustrated tubular wall 110 is of uniform thickness along its entire height and around its entire circumference. The tubular wall 110 defines an upper aperture 120 in the upper surface 110a and a cavity 130 that extends from the upper aperture 120 toward the lower surface 110b. The upper aperture 120 and cavity 130 are dimensioned to receive a reactor component 140.

The cavity 130 has a depth $D_C$ and an inner dimension ID between the outwardly facing surface 110c and inwardly facing surface 110d of the tubular wall 110. In the embodiment of FIG. 2, the cavity 130 has a depth $D_C$ equal to the height $H_W$ of the tubular wall 110 and the tubular wall 110 further defines a lower aperture 122. In other words, the cavity 130 extends through the entire height of the tubular wall 110 such that the cavity 130 defines a passageway extending through the tubular wall 110 from the upper aperture 120 to the lower aperture 122. In the embodiment of FIG. 3, the cavity 130 has a depth $D_C$ that is less than the height $H_W$ of the tubular wall 110, providing a cavity with a closed lower end 132. In some embodiments, the depth $D_C$ is from 20-95% of the height $H_W$, such as from 30-80% or 50-75% of the height $H_W$. The depth $D_C$ may be selected based in part on the length of a reactor component to be received by the cavity 130.

In the embodiments of FIGS. 2 and 3, the inner dimension ID of the cavity 130 is smaller than the thickness $T_W$ of the tubular wall 110, and the cavity is positioned between the outwardly facing surface 110c and inwardly facing surface 110d of the tubular wall 110 such that the cavity 130 is encased within the tubular wall 110. In an independent embodiment (not shown), the cavity 130 is an open slot or channel that is only partially encased within the tubular wall.

In another embodiment, as shown in FIGS. 4A and 4B, the inwardly facing surface 110d of the tubular wall 110 defines an inwardly facing lower aperture 124 at the bottom of the cavity such that the bore 111 is in fluid communication with the cavity 130. The cavity 130 extends from the upper aperture 120 to the inwardly facing lower aperture 124. The cavity 130 may extend at a substantially constant angle relative to the surfaces 110a, 110d and thereby provide a straight path between the apertures 120, 124 as shown in FIG. 4A. Alternatively, the cavity 130 may extend substantially parallel to the inwardly facing surface 110d for a first length $L_1$ and then angle toward the inwardly facing lower aperture 124 as shown in FIG. 4B.

A person of ordinary skill in the art understands that, in an alternate arrangement, the reaction chamber liner 100 of any one of FIGS. 1-4 may be flipped over such that the upper surface 110a becomes the lower surface. In such arrangements, the aperture 120 is in the lower surface of the tubular wall 110, and the cavity 130 extends upwardly into the wall.

In some embodiments, as shown in FIGS. 5-9, a reaction chamber liner 200 comprises a tubular wall 210 having an upper surface 210a, a lower surface 210b, an outwardly facing surface 210c, and an inwardly facing surface 210d configured to define a bore 211 that is at least a portion of a reaction chamber. The tubular wall 210 has a height $H_W$ between the upper surface 210a and the lower surface 210b. The tubular wall 210 comprises at least one inwardly projecting ridge 212 that is defined by a portion of the inwardly facing surface 210d of the tubular wall and by a corresponding portion of the upper surface 210a, the ridge having a length $L_R$, wherein $L_R < H_W$. The tubular wall 210 defines an upper aperture 220 in the upper surface 210a and a cavity 230 that extends from the upper aperture 220 toward the lower surface 210b. The upper aperture 220 is in the portion of the upper surface 210 corresponding to the ridge 212 such that the cavity 230 is at least partially positioned in the ridge. The upper aperture 220 and cavity 230 are dimensioned to receive a reactor component 240.

Figures 7, 8:
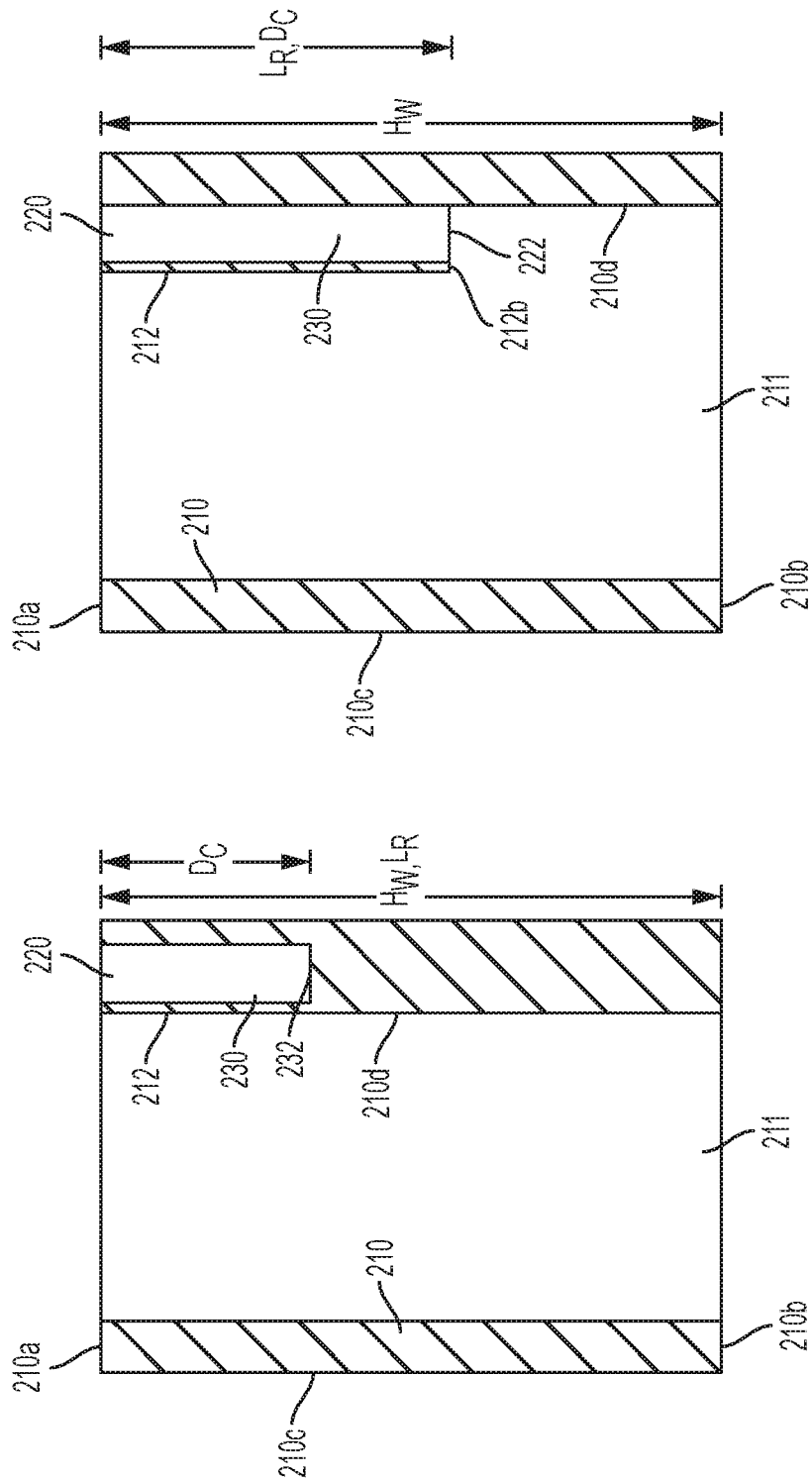
FIG. 7 is a schematic vertical cross-sectional view extending through the cavity of the liner of FIG. 5, wherein the ridge has a height equal to the tubular wall height, and the cavity has a depth less than the tubular wall height.
FIG. 8 is a schematic vertical cross-sectional view extending through the cavity of the liner of FIG. 5, wherein the ridge has a height less than the tubular wall height and the cavity has a depth equal to the ridge height and less than the tubular wall height.

As shown in FIGS. 6 and 7, the ridge 212 may be defined by the portion of the inwardly facing surface 210d of the tubular wall 210, by the corresponding portion of the upper surface 210a, and by a corresponding portion of the lower surface 210b of the tubular wall 210 such that $L_R = H_W$. In one embodiment, the tubular wall 210 further defines a lower aperture 222 in the corresponding portion of the lower surface 210b, and the depth $D_C$ of the cavity 230 is equal to the ridge length $L_R$ such that the cavity 230 defines a passageway extending from the upper aperture 220 through the ridge 212 to the lower aperture 222 (FIG. 6). In an independent embodiment, the depth $D_C$ of the cavity 230 is less than the ridge length $L_R$ and the cavity 230 has a closed lower end 232 (FIG. 7).

Figure 9:
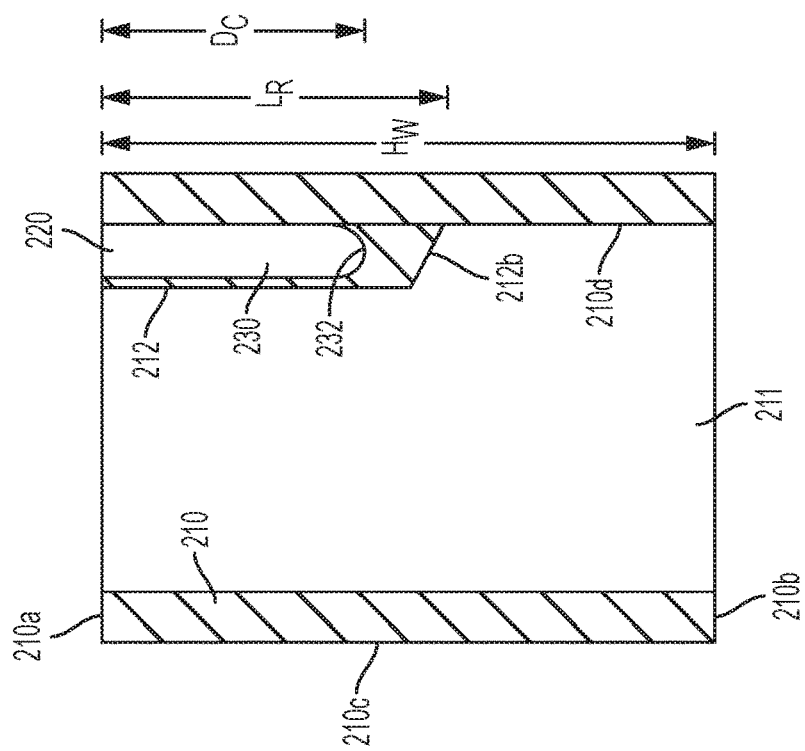
FIG. 9 is a schematic vertical cross-sectional view extending through the cavity of the liner of FIG. 5, wherein the ridge has a height less than the tubular wall height and the cavity has a depth less than the ridge height.

The ridge 212 may have a length $L_R$ less than the tubular wall height $H_W$ and a lower surface 212b, as shown in FIGS. 8 and 9. In one embodiment, the lower surface 212b of the ridge defines a lower aperture 222, and the depth of the cavity $D_C$ is equal to the length $L_R$ of the ridge 212 such that the cavity 230 defines a passageway extending from the upper aperture 220 to the lower aperture 222 (FIG. 8). In an independent embodiment, the depth of the cavity $D_C$ is less than the ridge length $L_R$ and the cavity 230 has a closed lower end 232 (FIG. 9).

A person of ordinary skill in the art understands that, in an alternate arrangement, the reaction chamber liner 200 of any one of FIGS. 5-9 may be flipped over such that the upper surface 210a becomes the lower surface. In such arrangements, the aperture 220 is in the lower surface of the tubular wall 210, and the cavity 230 extends upwardly into the protrusion 212.

In an alternate embodiment (not shown), the tubular wall comprises at least one outwardly projecting ridge that is defined by a portion of the outwardly facing surface of the tubular wall and by a corresponding portion of the upper surface of the tubular wall. The tubular wall defines an upper aperture in the upper surface and a cavity that extends from the upper aperture toward the lower surface. The upper aperture is in the portion of the upper surface corresponding to the outwardly projecting ridge such that the cavity is at least partially positioned in the ridge. The upper aperture and cavity are dimensioned to receive a reactor component.

Figure 10:
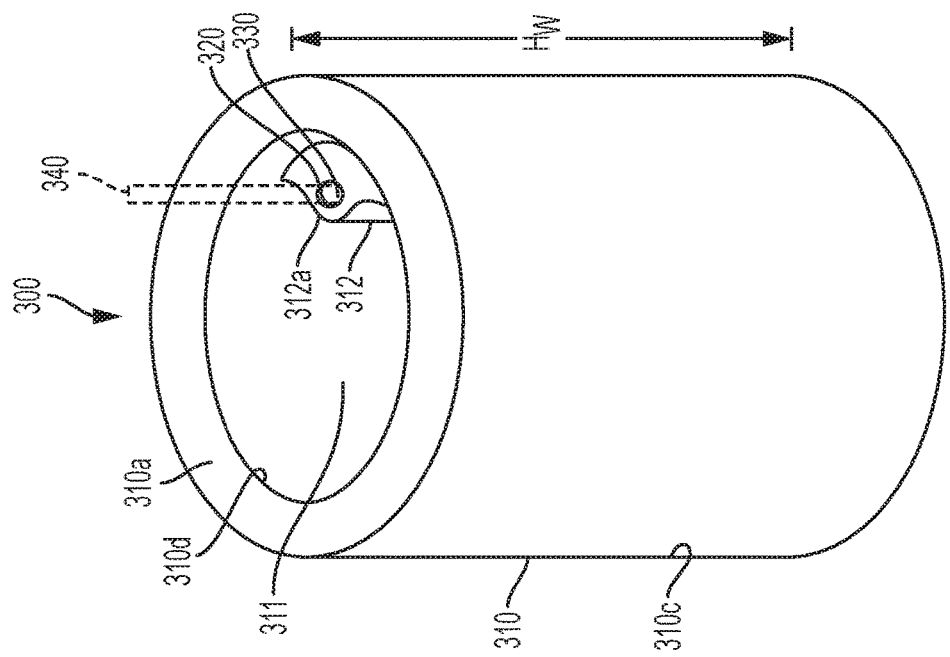
FIG. 10 is a schematic oblique view of a reaction chamber liner comprising a tubular wall comprising an inwardly projecting ridge defined by a portion of the inwardly facing surface of the tubular wall, the ridge defining an upper aperture in the upper surface of the ridge and a cavity that extends from the upper aperture into the ridge.

In some embodiments, as shown in FIGS. 10-12, a reaction chamber liner 300 comprises a tubular wall 310 having an upper surface 310a, a lower surface 310b, an outwardly facing surface 310c, and an inwardly facing surface 310d configured to define a bore 311 that is at least a portion of a reaction chamber. The tubular wall 310 has a height $H_W$ between the upper surface 310a and the lower surface 310b. At least one inwardly projecting ridge 312 is defined by a portion of the inwardly facing surface 310d. The ridge has an upper surface 312a, a lower surface 312b, and a length $L_R$ between the upper surface 312a and lower surface 312b, wherein $L_R<H_W$. The ridge 312 defines an upper aperture 320 in the upper surface 312a of the ridge and a cavity 330 that extends from the upper aperture 320 into the ridge 312 and has a depth $D_C$. The upper aperture 320 and cavity 330 are dimensioned to receive a reactor component 340. In one embodiment, the depth $D_C$ is less than the ridge length $L_R$, and the cavity 330 has a closed end 332 (FIG. 11). In an independent embodiment, the depth $D_C$ of the cavity is equal to the ridge length $L_R$, and the lower surface 312b of the ridge further defines a lower aperture 322, such that the cavity 330 defines a passageway extending through the ridge 312 from the upper aperture 320 to the lower aperture 322 (FIG. 12). Again, a person of ordinary skill in the art understands that the tubular wall 310 of any one of FIGS. 10-12 may be flipped over such that the upper surface 310a becomes the lower surface.

Depending on the size of the reaction chamber liner, manufacturing and reactor design limitations may not allow for a single-piece reaction chamber liner to be prepared. For example, it may not be possible to make a sufficiently large, single-piece silicon carbide or graphite liner for a commercial-scale FBR. Accordingly, a reaction chamber liner may be assembled from a plurality of segments.

A segmented reaction chamber liner may be constructed of vertically stacked segments and/or laterally joined segments. In the exemplary embodiments of FIG. 13-16, a segmented reaction chamber liner 400 comprises three vertically stacked tubular wall segments 402, 406, 410. A person of ordinary skill in the art understands that the segmented liner may include two, three, four, or more than four vertically stacked segments. The number of segments is determined, at least in part, by the desired height of the liner and the height of the individual segments. Manufacturing limitations may determine the height of individual segments.

In one embodiment (FIGS. 13, 16), at least one tubular wall segment, e.g., tubular wall 410, has an upper surface 410a, a lower surface 410b, an outwardly facing surface 410c, an inwardly facing surface 410d, and a height $H_W$ between the upper surface 410a and the lower surface 410b. The inwardly-facing surface 410d is configured to define a bore 411 that is at least a portion of a reaction chamber. The tubular wall segment 410 comprises at least one inwardly projecting ridge 412 defined by a portion of the inwardly facing surface 410d of the upper wall and by a corresponding portion of the upper surface 410a. The ridge 412 has a length $L_R$, wherein $L_R \leq H_W$ (e.g., as shown in FIGS. 5-9, wherein 210 corresponds to 410, 212 corresponds to 412, etc.). The corresponding portion of the upper surface 410a defines an upper aperture 420 and a cavity 430 that extends into the ridge 412. The cavity 430 has a depth $D_C$ that is less than or equal to the ridge length $L_R$. When the depth $D_C$ is equal to the ridge length $L_R$, a lower aperture 422 is defined by a lower surface 412b of the ridge and the cavity 430 extends from the upper aperture 420 to the lower aperture 422 (see, e.g., FIG. 16, and FIGS. 6, 8 where 212b corresponds to 412b, 222 corresponds to 422, etc.). When the depth $D_C$ is less than the ridge length $L_R$, the cavity 430 has a closed lower end 432 (see, e.g., FIGS. 7, 9 where 230 corresponds to 430, 232 corresponds to 432, etc.). Although the inwardly projecting ridge is shown as a part of the upper tubular wall segment 410, a person of ordinary skill in the art will understand that tubular wall segment 402 and/or tubular segment 406 alternatively, or additionally, may comprise an inwardly projecting ridge including an aperture and a cavity as described. When two or more tubular wall segments include an inwardly projecting ridge, the segments may be positioned such that the ridges and cavities are aligned, thereby permitting a reactor component to be inserted through the aligned cavities of two or more tubular wall segments. Alternatively, the segments may be positioned such that the ridges and cavities are not aligned, thereby permitting separate reactor components to be inserted into each of the cavities.

Figure 16:
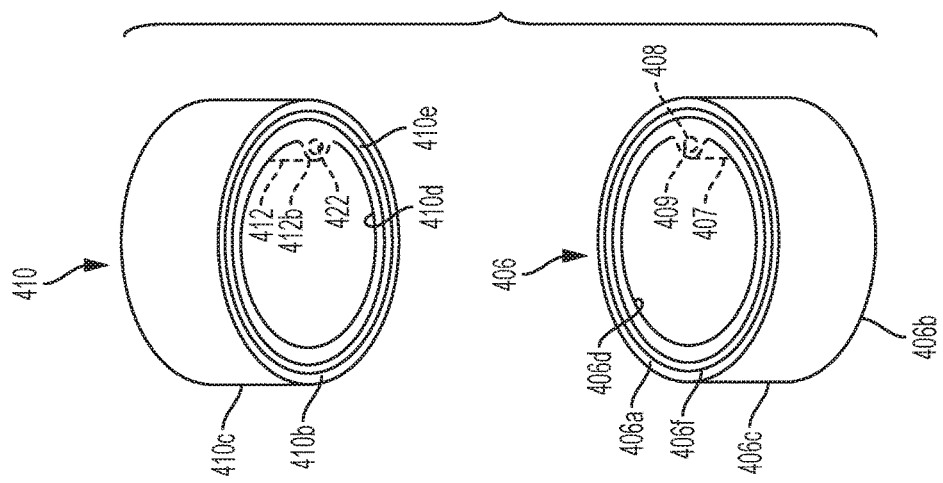
FIG. 16 is a schematic exploded view of a first segment and a second segment of the segmented liner of FIGS. 13-14.

In an independent embodiment (FIG. 14), a segmented reaction chamber liner 400 comprises three vertically stacked tubular wall segments 402, 406, 410. At least one tubular wall segment, e.g., tubular wall 410, comprises at least one inwardly projecting ridge 412 defined by a portion of the inwardly facing surface 410d. The inwardly-facing surface 410d is configured to define a bore 411 that is at least a portion of a reaction chamber. The ridge has an upper surface 412a, a lower surface 412b (not shown), and a length $L_R$ between the upper surface 412a and lower surface 412b, wherein $L_R<H_W$ (e.g., as shown in FIGS. 10-12, wherein 312 corresponds to 412, 312b corresponds to 412b, etc.). The ridge 412 defines an upper aperture 420 in the upper surface 412a of the ridge and a cavity 430 that extends from the upper aperture 420 into the ridge 412 and has a depth $D_C$. In one embodiment, the depth $D_C$ is less than the ridge length $L_R$, and the cavity 430 has a closed end 432 (see, e.g., FIG. 11 where 330 corresponds to 430, 332 corresponds to 432, etc.). In an independent embodiment, the depth $D_C$ of the cavity is equal to the length $L_R$ of the ridge, and the lower surface 412b of the ridge further defines a lower aperture 422, such that the cavity extends through the ridge 412 from the upper aperture 420 to the lower aperture 422 (see, e.g., FIG. 12 where 312 corresponds to 412, 322 corresponds to 422, etc.). Although the inwardly projecting ridge is shown as a part of the upper tubular wall segment 410, a person of ordinary skill in the art will understand that tubular wall segment 402 and/or tubular wall segment 406 alternatively, or additionally, may comprise an inwardly projecting ridge including an aperture and a cavity as described. For example, tubular wall segment 406 may comprise at least one inwardly projecting ridge 407 defined by a portion of the inwardly facing surface 406d; the ridge 407 defines an upper aperture 408 in an upper surface 407a of the ridge and a cavity 409 that extends from the upper aperture 408 into the ridge 407 (FIG. 16). When two or more tubular wall segments include an inwardly projecting ridge with an aperture and a cavity, the tubular wall segments may be positioned so that the ridges and cavities are aligned, or so that the ridges and cavities are not aligned as described previously.

In another independent embodiment (FIG. 15), a segmented reaction chamber liner 400 comprises three vertically stacked tubular wall segments 402, 406, 410. Tubular wall 410 defines an upper aperture 420 in the upper surface 410a and a cavity 430 that extends from the upper aperture 420 toward the lower surface 410b (not shown). The tubular wall 410 has a height $H_W$ and the cavity 430 has a depth $D_C$. In one embodiment, $D_C=H_W$ and the cavity 430 defines a passageway extending from the upper surface 410a to the lower surface 410b (e.g., as shown in FIG. 2, wherein 110 corresponds to 410, 110b corresponds to 410b, etc.). In an independent embodiment, $D_C$ is less than $H_W$ (e.g., as shown in FIGS. 3, 4A, and 4B). The depth $D_C$ may be, for example, from 20-95% of the height $H_W$, such as from 30-80% or 50-75% of the height $H_W$. The depth $D_C$ may be selected based in part on the length of a reactor component to be received by the cavity. Although the aperture 420 and cavity 430 are shown in tubular wall segment 410, a person of ordinary skill in the art will understand that if the cavity depth $D_C=H_W$, tubular wall segment 406 also may include a cavity extending therethrough, the cavity having a depth $D_C$ less than or equal to the segment height $H_W$, with the tubular wall segments positioned such that the cavities are aligned, thereby permitting a reactor component to be inserted through the aligned cavities of vertically stacked segments 410 and 406. If tubular wall segment 406 includes a cavity having a depth $D_C$ equal to $H_W$, then tubular wall segment 402 also may include a cavity extending therethrough, the cavity having a depth $D_C$ less than or equal to the segment height $H_W$, with the tubular wall segments positioned such that the cavities are aligned, thereby permitting a reactor component to be inserted through the aligned cavities of vertically stacked segments 410, 406, and 402.

Figure 13:
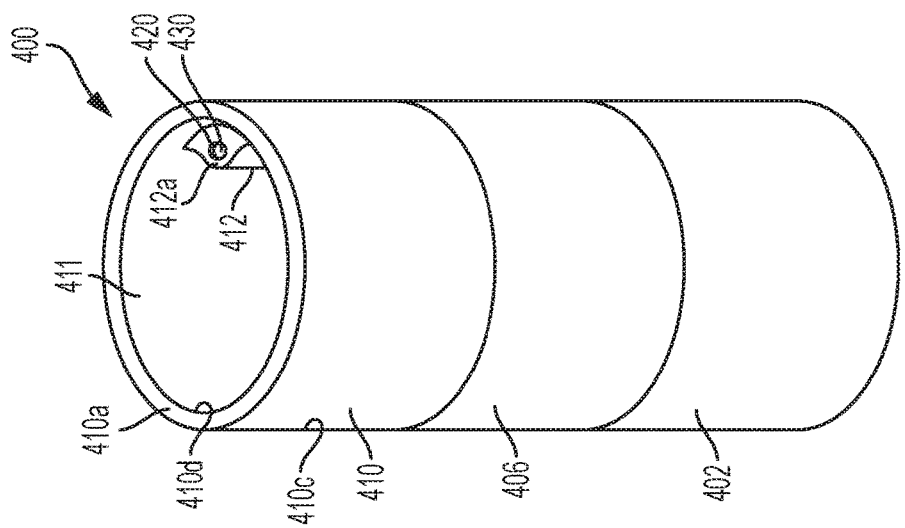
FIG. 13 is a schematic oblique view of a segmented reaction chamber liner including plural stacked segments, wherein one segment is a tubular wall comprising an inwardly projecting ridge defined by a portion of the inwardly facing surface of the tubular wall and a corresponding portion of the upper surface of the tubular wall, the ridge defining an upper aperture in the upper surface of the ridge and a cavity that extends from the upper aperture into the ridge.
Figure 14:
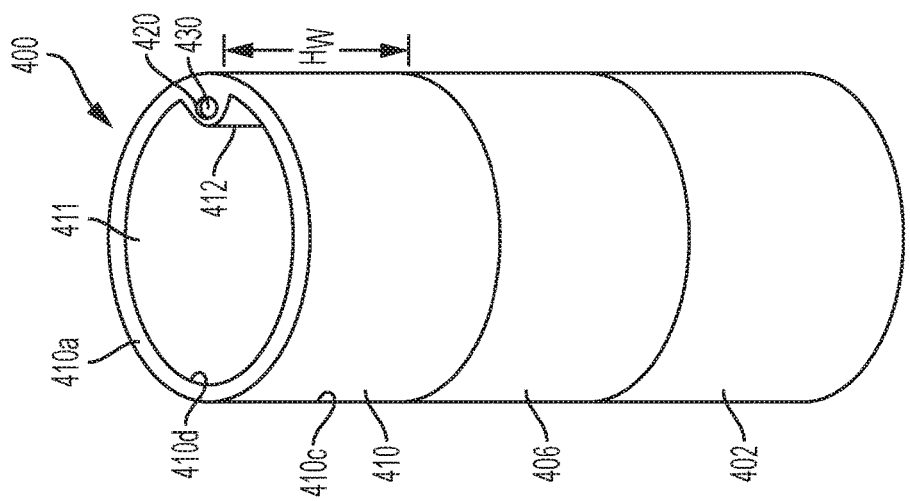
FIG. 14 is a schematic oblique view of a segmented reaction chamber liner including plural stacked segments, wherein one segment is a tubular wall comprising an inwardly projecting ridge defined by a portion of the inwardly facing surface of the tubular wall, the ridge defining an upper aperture in the upper surface of the ridge and a cavity that extends from the upper aperture into the ridge.
Figure 15:
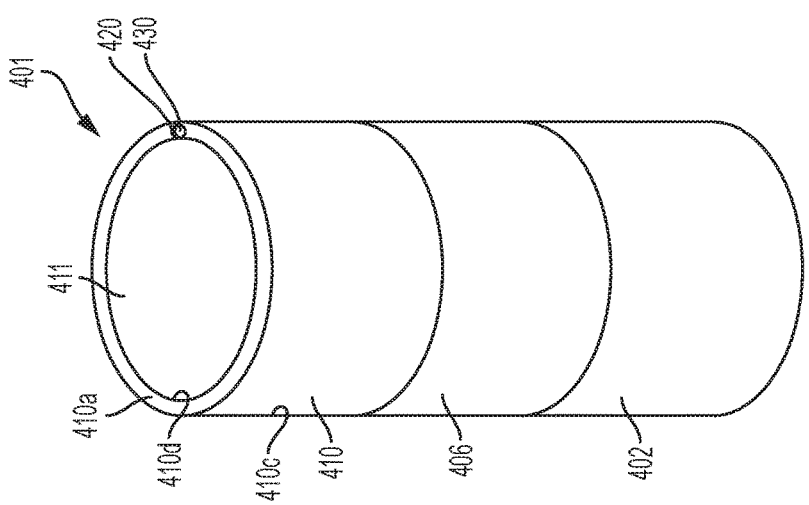
FIG. 15 a schematic oblique view of a segmented reaction chamber liner including plural stacked segments, wherein one segment is a tubular wall, an upper surface of the tubular wall defining an upper aperture and a cavity that extends from the upper aperture into the tubular wall.

A person of ordinary skill in the art understands that, in an alternate arrangement, the reaction chamber liner 400 of any one of FIGS. 13-15 may be flipped over such that the upper segment 410 becomes the lower segment. In such arrangements, the aperture 420 is in the lower surface of the ridge 412 (FIGS. 13, 14) or the lower surface of segment 410 (FIG. 15).

Adjacent tubular wall segments, e.g., tubular wall segments 406, 410, may include female and male joint portions, respectively, and a volume of bonding material may be disposed between abutting edge surfaces of the adjacent segments. In some embodiments, as shown in FIG. 16, a lower tubular wall segment 406 has an upper edge surface 406a, a lower edge surface 406b, an outwardly facing surface 406c, and an inwardly facing surface 406d. The upper edge surface 406a defines an upwardly opening depression 406f. Tubular wall segment 410 is located above and abutted to tubular wall segment 406. The lower edge surface 410b of tubular wall segment 410 defines a downwardly extending protrusion 410e received within depression 406f. In some examples, the joint portions have a tongue-and-groove configuration, wherein the depression 406f corresponds to the groove and the protrusion 410e corresponds to the tongue. The protrusion 410e has smaller dimensions than the depression 406f such that, when the protrusion 410e is received in the depression 406f, the surface of the depression 406f is spaced apart from the lower surface of the protrusion 410e and a space is located between the protrusion 410e and the depression 406f. The space has a suitable size to accommodate a volume of bonding material. Although the bonding material can bond the segments in the absence of a space, the space facilitates even distribution of the bonding material and allows excess bonding material to flow out and be removed as pressure is applied to the segments. A person of ordinary skill in the art understands that, in an alternate arrangement, the protrusion may extend upward from the lower segment and the depression may be located on the lower edge surface of the upper segment, i.e., the upper edge surface of segment 406 may define an upwardly extending protrusion and the lower edge surface of segment 410 may define a downwardly opening depression. However, the arrangement illustrated in FIG. 16 is more convenient for retaining the bonding material. When one or both of the tubular wall segments 406, 410 includes an aperture, e.g., apertures 408, 422, care is taken so that bonding material does not occlude the aperture(s).

Figure 18:
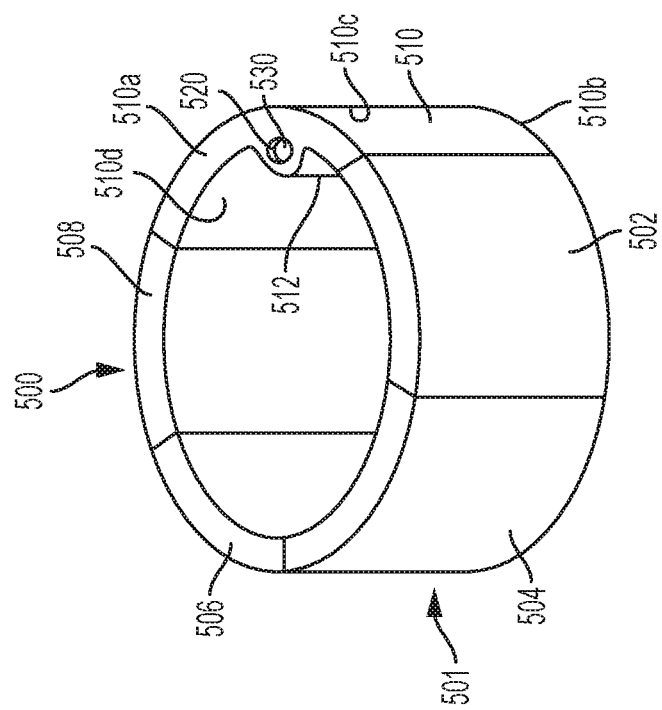
FIG. 18 is a schematic oblique view of a segmented liner including plural laterally joined segments, wherein one segment comprises an inwardly projecting ridge defined by a portion of the inwardly facing surface of the segment wall and by a corresponding portion of the upper surface of the segment, wherein the upper surface of the segment defines an upper aperture and a cavity that is positioned in the ridge.
Figure 17:
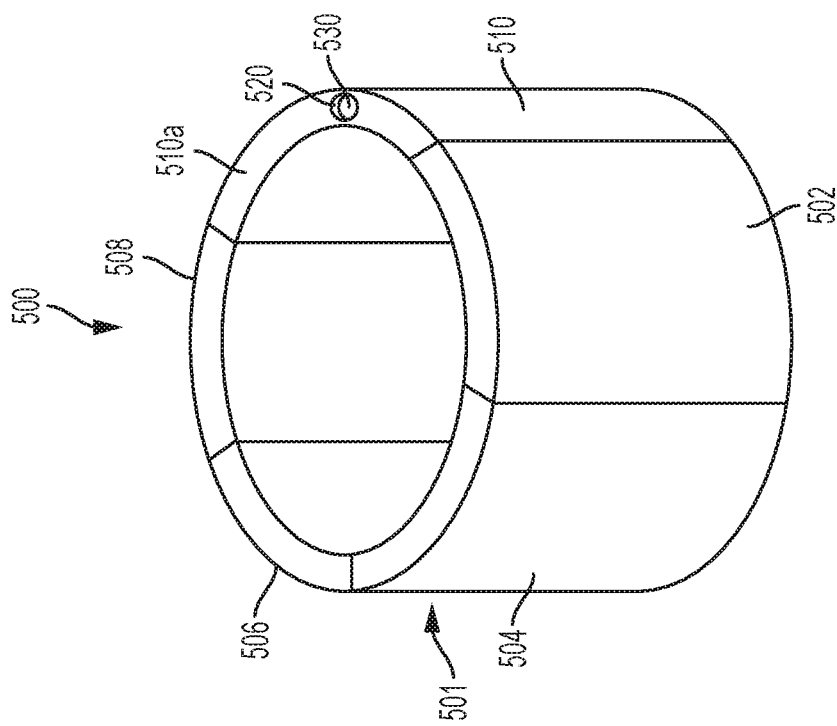
FIG. 17 is a schematic oblique view of a segmented liner including plural laterally joined segments, wherein one segment has an upper surface that defines an upper aperture and a cavity that extends from the aperture toward a lower surface of the segment.
Figure 19:
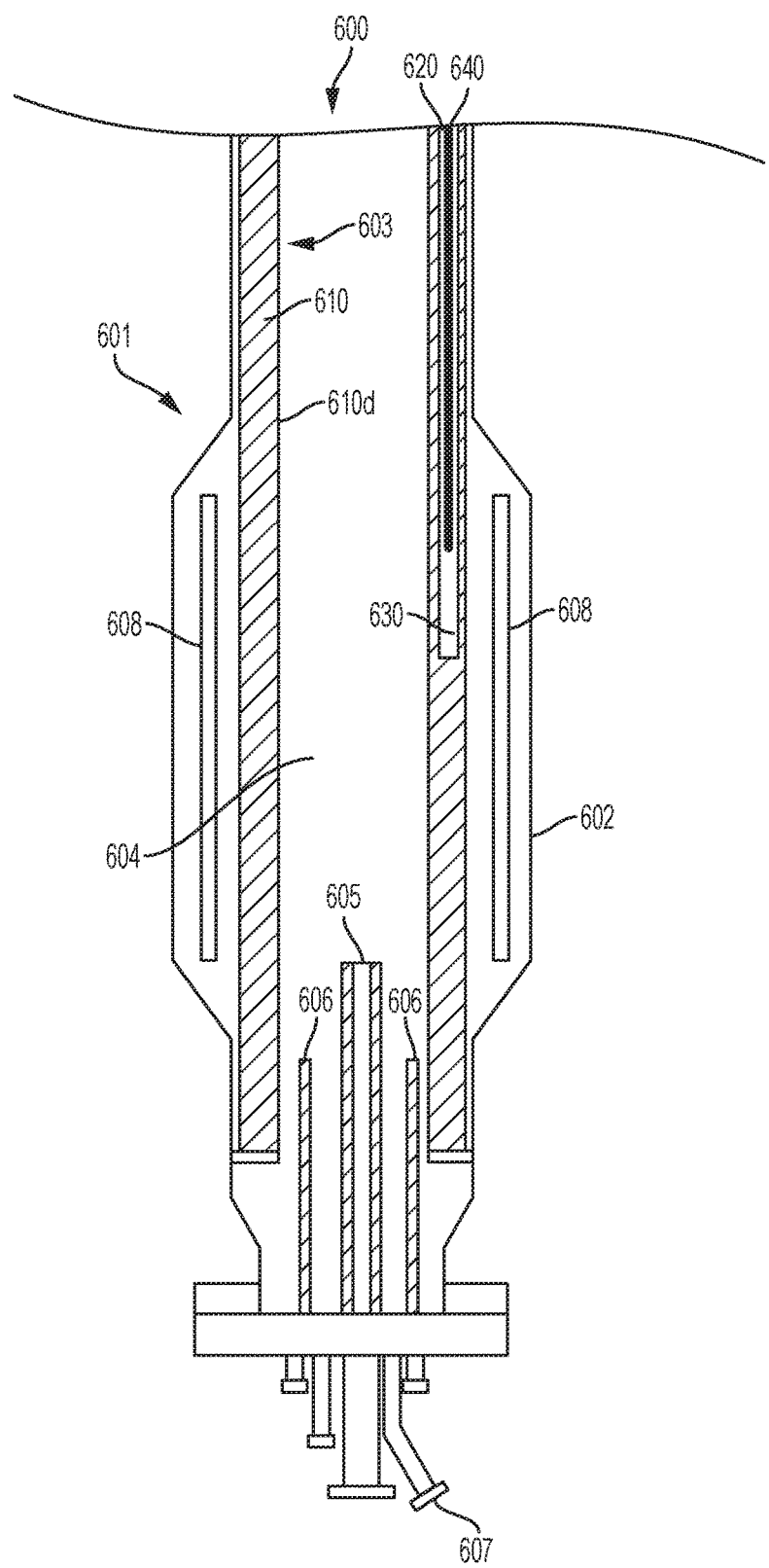
FIG. 19 is a schematic cross-sectional elevational view of a fluidized bed reactor including a reaction chamber liner according to FIG. 1.

In some embodiments, a segmented reaction chamber liner 500 comprises a tubular wall 501 constructed of a plurality of laterally joined segments 502, 504, 506, 508, 510 as shown in FIGS. 17 and 18. A person of ordinary skill in the art understands that the segmented liner may include two, three, four, five, or more than five laterally joined segments. A volume of bonding material may be disposed between abutting lateral edge surfaces of each pair of adjacent segments. It may be preferable to use fewer segments to reduce contamination from bonding material used to join the segments. However, the number of segments also may be determined in part by handling ease when assembling the liner.

In the embodiment of FIG. 17, a reaction chamber liner 500 comprises a tubular wall 501 including laterally joined segments 502, 504, 506, 508, 510. At least one segment includes an aperture and a cavity positioned within the segment. For example, as shown in FIG. 17, segment 510 has an upper surface 510a, a lower surface 510b, an outwardly facing surface 510c that is a portion of the outwardly facing surface of the tubular wall 501, and an inwardly facing surface 510d that is a portion of the inwardly facing surface of the tubular wall 501. The upper surface 510a defines an aperture 520 and a cavity 530 that extends from the upper surface 501a toward the lower surface 510b. The segment 510 has a height $H_W$ and the cavity 530 has a depth $D_C$ that is less than or equal to the height $H_W$ (e.g., as shown in FIGS. 2-4B, wherein 120 corresponds to 520, 130 corresponds to 530, etc.). In some embodiments, the depth $D_C$ is from 20-95% of the height $H_W$, such as from 30-80% or 50-75% of the height $H_W$. The depth $D_C$ may be selected based in part on the length of a reactor component to be received by the cavity 530. Although only one segment of the reaction chamber liner 500 is shown with an aperture and a cavity, a person of ordinary skill in the art will understand that one or more additional laterally joined segments also may include an aperture and a cavity as described.

In an independent embodiment, at least one laterally joined segment includes an inwardly projecting ridge, wherein the cavity is positioned within the ridge. For example, as shown in FIG. 18, an inwardly projecting ridge 512 is defined by a portion of the inwardly facing surface 510d and a corresponding portion of the upper surface 510a of segment 510. An aperture 520 is defined in the portion of the upper surface 510a corresponding to the ridge 512 such that the cavity 530 is positioned in the ridge 512. The segment 510 has a height $H_W$, the ridge 512 has a length $L_R$, and the cavity has a depth $D_C$, wherein $L_R \leq H_W$ and $D_C \leq L_R$ (e.g., as shown in FIGS. 6-9, wherein 212 corresponds to 512, 220 corresponds to 520, etc.). Although only one segment of the reaction chamber liner 500 is shown with inwardly projecting ridge including an aperture and a cavity, a person of ordinary skill in the art will understand that one or more additional laterally joined segments also may include an inwardly projecting ridge including an aperture and a cavity as described. In another independent embodiment (not shown), the ridge has an upper surface below the segment upper surface, wherein the aperture is defined by the upper surface of the ridge (e.g., as shown in FIG. 10).

A person of ordinary skill in the art understands that, in an alternate arrangement, the entire tubular wall 500 or segment 510 of FIG. 17 or FIG. 18 may be flipped over such that the upper surface of segment 510 becomes the lower surface. In such arrangements, the aperture 520 is in the lower surface of segment 510 (FIG. 17) or the lower surface of the ridge 512 (FIG. 18).

Each laterally joined segment has lateral edge surfaces. In some embodiments, each lateral edge surface defines either a laterally opening depression or a laterally extending protrusion along at least a portion of the length of the lateral edge surface (similar to the upwardly opening depression and downwardly extending protrusion of tubular walls 406, 410 of FIG. 16). Advantageously, the protrusion has smaller dimensions than the depression so that a space is located between the protrusion and the depression when two adjacent segments are laterally abutted. A bonding material may be disposed within the space. The segments are oriented such that an edge surface defining a depression is positioned adjacent an edge surface that defines a protrusion.

In certain embodiments, a reaction chamber liner comprises two or more vertically stacked tubular walls, each tubular wall including a plurality of laterally joined segments. At least one segment of the reaction chamber liner includes an aperture and a cavity as described above. As described above with respect to FIG. 15, a segment including a cavity having a depth $D_C$ equal to a segment height $H_W$ may be aligned with a cavity in a segment directly below such that a reactor component may be inserted through two or more vertically stacked segments.

III. Reaction Chamber Liner Materials and Bonding Materials

Embodiments of the disclosed reaction chamber liners are constructed of materials capable of withstanding operating conditions (e.g., temperatures up to 900° C.) in a fluidized bed reactor for making polycrystalline silicon. Advantageously, the liner is constructed of a non-contaminating or minimally contaminating material. Suitable liner materials include, but are not limited to, silicon carbide, graphite, quartz, silicon nitride, Si- or SiC-coated graphite, carbon fiber, Si- or SiC-coated carbon fiber, or a stainless steel alloy.

In some embodiments, at least a portion of the reaction chamber liner is constructed from reaction-bonded SiC (RBSiC). An inwardly facing surface of a portion of the tubular wall may comprise RBSiC having surface contamination levels of less than 3% atomic of dopants and less than 5% atomic of foreign metals. Dopants in RBSiC include B, Al, Ga, Be, Sc, N, P, As, Ti, Cr, or any combination thereof. In some embodiments, the portion has a surface contamination level of less than 3% atomic of dopants B, Al, Ga, Be, Sc, N, P, As, Ti, and Cr, combined. The inwardly facing surface of the liner portion constructed of RBSiC advantageously has a surface contamination level comprising less than 1% atomic of phosphorus and less than 1% atomic of boron.

The RBSiC desirably has a mobile metal concentration sufficiently low that the polysilicon-coated granulate material produced in the fluidized bed reactor has a mobile metal contamination level of ≤1 ppbw as measured by inductively coupled plasma mass spectroscopy (ICPMS) and based on the entire mass of the granule. For aluminum, a contamination level of 1 ppbw or greater might result when aluminum is present in the RBSiC at a sufficient concentration that an aluminum partial pressure in the FBR is at least 1 Pa, e.g., at least 1 Pa at operating conditions within the FBR. For heavier elements (e.g., Fe, Cr), undesirable product contamination levels may occur at lower partial pressures. In some embodiments, the RBSiC has a mobile metal concentration sufficiently low that a total mobile metal partial pressure in the FBR is less than 0.1 Pa for the sum of all mobile metal partial pressures during operation of the FBR. The mobile metals include aluminum, chromium, iron, copper, magnesium, calcium, sodium, nickel, tin, zinc, and molybdenum. Partial pressure is calculated based on the contamination level measured by ICPMS in the granulate material. Vapor pressures of metals can be estimated by the Antoine equation:

$$\log p(atm) = A + B \times T^{-1} + C \times \log(T) + D \times T \times 10^{-3},$$

where p is metal vapor pressure (atm), T is temperature in Kelvins, A, B, C, and D are component-specific constants (Alcock, Thermochemical Processes Principles and Models, Butterworth-Heinemann, 2001, p. 38). The calculation assumes that all the vapors of the particular impurity are incorporated into the granulate material. The impurity vapors may be assumed to obey the ideal gas law. Moles or mass of the impurity in the reactor is calculated with the ideal gas law. A concentration in the granulate material is then calculated using the total mass of granulate material in the FBR.

In some embodiments, the RBSiC is siliconized SiC produced by exposing a finely divided mixture of silicon carbide and carbon particles to liquid or vaporized silicon at high temperatures. In certain embodiments, the liquid or vaporized silicon is solar-grade or electronic-grade silicon.

SiC-coated reaction chamber liners may be coated with RBSiC as described above. Silicon-coated reaction chamber liners, e.g., Si-coated graphite or carbon fiber liners, may be coated with solar-grade or electronic-grade silicon.

In some embodiments, at least a portion of the reaction chamber liner is constructed from a metal alloy. Suitable alloys include, but are not limited to, high-temperature steels, e.g., 304H or 304L stainless steel, certain nickel alloys, e.g., Incoloy® 800H, certain iron-chromium-nickel-molybdenum alloys, or cobalt-based superalloys (a cobalt-based alloy having a face-centered cubic crystal structure, and suitable for use at temperatures above 540° C. (1000° F.)). Stainless steel 304H comprises 0.04-0.1 wt % carbon, up to 2 wt % manganese, up to 0.045 wt % phosphorus, up to 0.03 wt % sulfur, up to 0.75 wt % silicon, 18-20 wt % chromium, 8-10.5 wt % nickel, up to 0.1 wt % nitrogen, with the balance being iron. Stainless steel 304L comprises up to 0.03 wt % carbon, up to 2 wt % manganese, up to 0.045 wt % phosphorus, up to 0.03 wt % sulfur, up to 0.75 wt % silicon, 18-20 wt % chromium, 8-12 wt % nickel, up to 0.1 wt % nitrogen, with the balance being iron. Incoloy® 800H is a nickel-iron-chromium alloy comprising 30-35 wt % nickel/cobalt (up to 2 wt % cobalt), 19-23 wt % chromium, up to 1 wt % silicon, up to 1.5 wt % manganese, 0.05-0.1 wt % carbon, 0.15-0.6 wt % aluminum, 0.15-0.6 wt % titanium, up to 0.015 wt % sulfur, with the balance being iron.

In certain embodiments, the metal alloy is a martensitic stainless steel alloy. Martensitic stainless steels have a body-centered tetragonal crystal structure, less than 20% (w/w) chromium, and less than 6% (w/w) nickel. They may include up to 1.2% (w/w) carbon. Martensitic stainless steels may include trace amounts (e.g., ≤1% (w/w)) of other elements including, but not limited to, silicon, manganese, phosphorus, sulfur, molybdenum, niobium, tungsten, vanadium, nitrogen, copper, selenium, or combinations thereof. Martensitic stainless steels are less corrosion resistant that austenitic and ferritic stainless steels, but are extremely strong, highly machinable, and can be hardened by heat treatment. Martensitic stainless steels are ferromagnetic.

Exemplary martensitic stainless steel alloys comprise less than 20% (w/w) chromium, such as 11-18% (w/w) chromium, and less than 3% (w/w) nickel, such as less than 1% (w/w) nickel. In one embodiment, the stainless steel alloy does not include copper or selenium. In one embodiment, the stainless steel alloy includes 11.5-13.5% (w/w) chromium and 0.7-0.8% (w/w) nickel. In another embodiment, the alloy includes 12-14% (w/w) chromium and less than 0.5% (w/w) nickel. In either of these embodiments, the alloy further may include ≤0.15% (w/w) carbon, ≤1% (w/w) silicon, ≤1% (w/w) manganese, ≤0.04% (w/w) phosphorus, and ≤0.03% (w/w) sulfur. In another embodiment, the stainless steel alloy includes 16-18% (w/w) chromium and less than 0.5% (w/w) nickel. The alloy may further include 0.5-1.5% (w/w) carbon, ≤1% (w/w) silicon, ≤1% (w/w) manganese, ≤0.04% (w/w), phosphorus, and ≤0.03% (w/w) sulfur. In some embodiments, the stainless steel alloy has a Rockwell hardness greater than 40 Rc, such as a Rockwell hardness of 45-60 Rc. Advantageously, the stainless steel alloy has a mean coefficient of thermal expansion less than $15 \times 10^{-6}$ m/m·° C. over a temperature range from 0° C.-315° C. In some embodiments, the mean coefficient of thermal expansion is from $9.9 \times 10^{-6}$ m/m·° C. to $11.5 \times 10^{-6}$ m/m·° C. In one embodiment, the mean coefficient of thermal expansion is $10.7 \times 10^{-6}$ m/m·° C. to $10.9 \times 10^{-6}$ m/m·° C. In another embodiment, the mean coefficient of thermal expansion is $11.3 \times 10^{-6}$ m/m·° C. to $11.5 \times 10^{-6}$ m/m·° C. In yet another embodiment, the mean coefficient of thermal expansion is $10.0 \times 10^{-6}$ m/m·° C. to $10.2 \times 10^{-6}$ m/m·° C.

In some embodiments, an inwardly facing surface of the liner may be coated with a Stellite® alloy (a non-magnetic, corrosion-resistant cobalt-chromium alloy comprising cobalt, chromium, carbon, and optionally tungsten, molybdenum, nickel, iron, aluminum, boron, manganese, phosphorus, sulfur, silicon, and/or titanium) or tungsten carbide/cobalt (e.g., 88% WC/12% Co, 83% WC/17% Co, 86% WC/10% Co/4% Cr). In some examples, an inwardly facing surfaces of the liner is coated with Stellite® 12, which includes 26-33% (w/w) chromium, 7-9.5% (w/w) tungsten, 0.1-1.5% (w/w) molybdenum, ≤2% (w/w) silicon, 0.5-1.5% (w/w) manganese, 1.1-1.9% (w/w) carbon, ≤2.5% (w/w) iron, ≤7% (w/w) nickel, ≤1% (w/w) boron, ≤0.03% (w/w) sulfur, ≤0.03% (w/w) phosphorus, with the balance being cobalt. One embodiment of Stellite® 12 (Kennametal Stellite) comprises 29.5% (w/w) chromium, 8.5% (w/w) tungsten, 1.5% (w/w) silicon, 1% (w/w) manganese, 1.4-1.85% (w/w) carbon, ≤2.5% (w/w) iron, ≤3% (w/w) nickel, with the balance being cobalt.

IV. Fluidized Bed Reactor

FIGS. 19-21A are simplified schematic diagrams of a fluidized bed reactor 600 for producing silicon-coated particles. The fluidized bed reactor 600 comprises a vessel 601 extending vertically and having an outer wall 602. A reaction chamber liner 603 comprising a tubular wall 610 is positioned inwardly of the outer wall 602 such that an inwardly facing surface 610d of the tubular wall defines at least a portion of a reaction chamber 604. Silicon-coated particles are grown by pyrolytic decomposition of a silicon-bearing gas within the reaction chamber 604 and deposition of silicon onto particles within a fluidized bed. One or more inlet tubes 605 are provided to admit a primary gas, e.g., a silicon-bearing gas or a mixture of silicon-bearing gas, hydrogen and/or an inert gas (e.g., helium, argon) into the reaction chamber 605. The reactor 600 further includes one or more fluidization gas inlets 606. Additional hydrogen and/or inert gas can be delivered into the reactor through the fluidization inlets 606 to provide sufficient gas flow to fluidize the particles within the reactor bed. Silicon-coated particles are harvested by removal from reactor 600 through one or more outlets 607. The reactor 600 further includes one or more heaters 608 between the tubular wall 610 and the outer wall 602.

Figure 20:
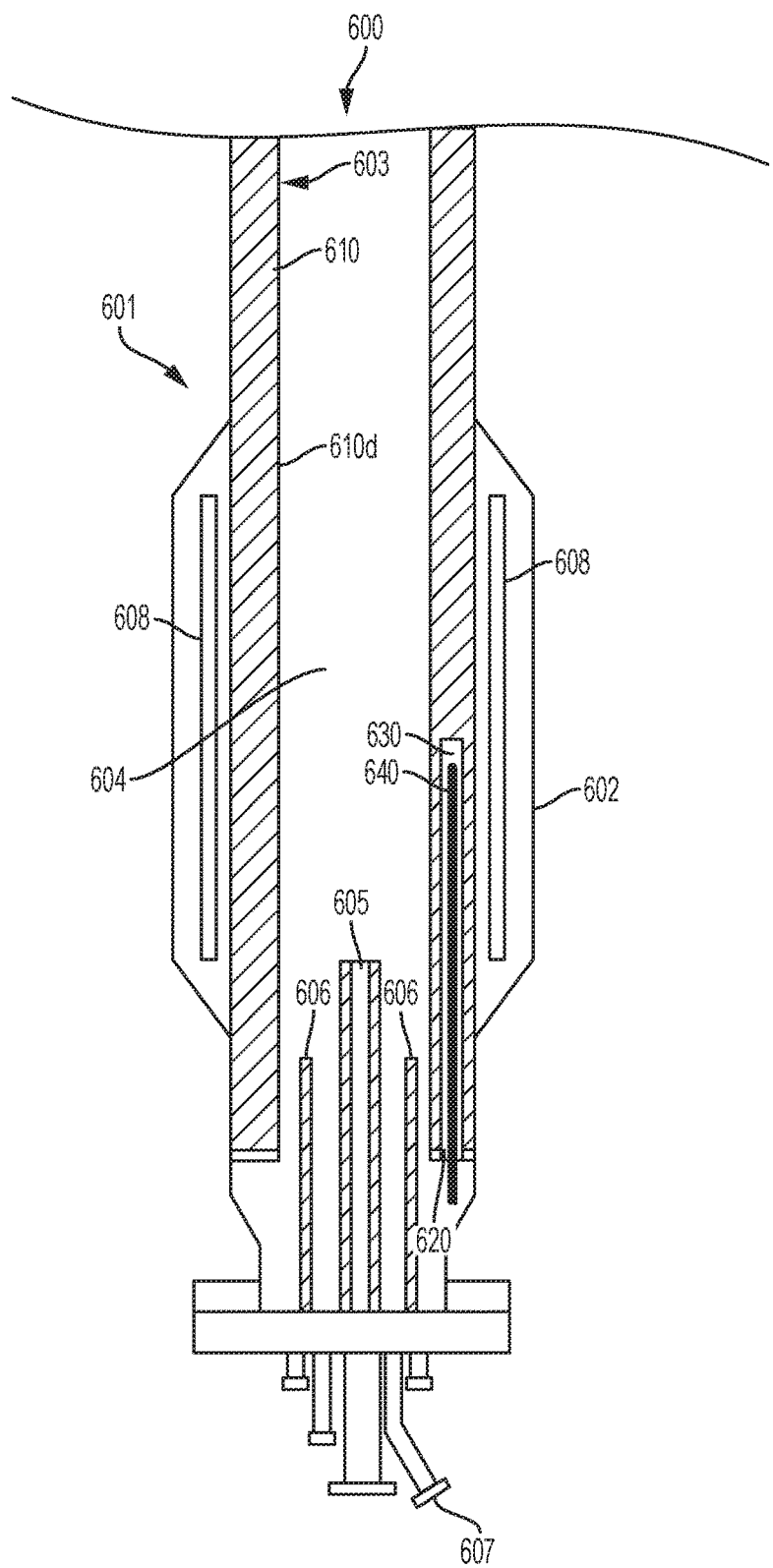
FIG. 20 is a schematic cross-sectional elevational view of a fluidized bed reactor including a reaction chamber liner comprising a tubular wall having lower surface that defines a lower aperture and a cavity that extends upwardly from the aperture toward an upper surface of the tubular wall.

The tubular wall 610 includes at least one aperture 620 and corresponding cavity 630. The tubular wall 610 may have any configuration disclosed herein. In some embodiments, the aperture 620 and cavity 630 are defined by an upper surface of the tubular wall 610 (e.g., as shown in FIGS. 1-4B, 19). In an independent embodiment, and the aperture 620 is defined by a lower surface of the tubular wall and cavity 630 extends upwardly from the aperture 620 as shown in FIG. 20.

In other embodiments, the tubular wall 610 comprises at least one inwardly projecting, vertically extending ridge 612, and the aperture 620 and cavity 630 are within the ridge 612 (e.g., as shown in FIGS. 5-12, 21A, and 21B). The cavity 630 may be an open cavity, i.e., having a lower aperture or inwardly opening aperture so that the cavity is in fluid communication with the reaction chamber 604 (e.g., as shown in FIGS. 2, 4A, 4B, 6, 8, 12, and 21B. Alternatively, the cavity 630 may have a closed lower end (e.g., as shown in FIGS. 3, 7, 9, and 11).

The tubular wall 610 may be a unitary tubular wall (e.g., as shown in FIGS. 1-12). Alternatively, the tubular wall 610 may be a segmented tubular wall (e.g., as shown in FIGS. 13-18).

Figures 21A, 21B:
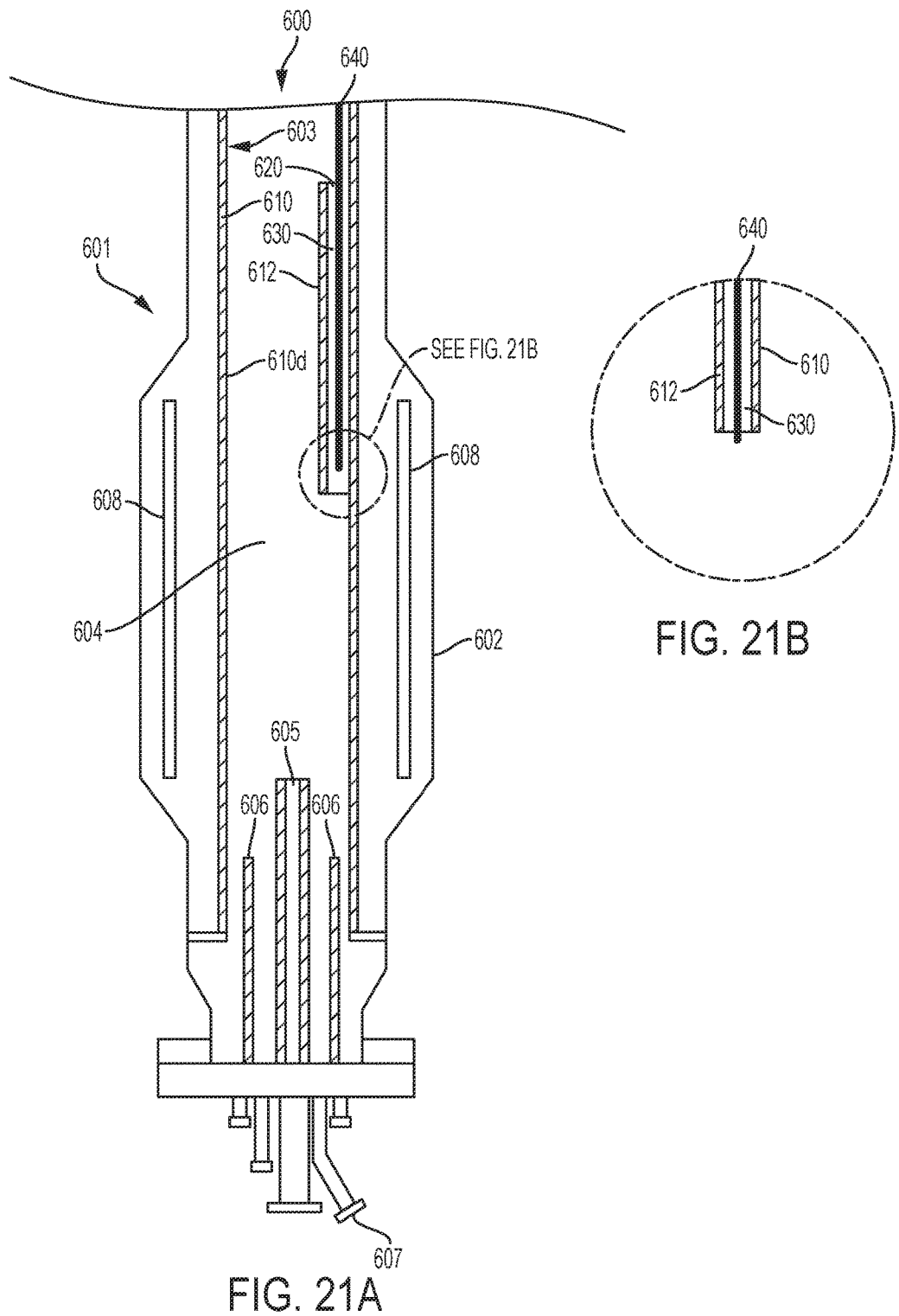
FIG. 21A is a schematic cross-sectional elevational view of a fluidized bed reactor including a reaction chamber liner according to FIG. 10.
FIG. 21B is an enlarged view of a portion of FIG. 21A showing an alternate arrangement of the reactor component.

A reactor component 640 may be inserted into the cavity 630 (FIGS. 19, 20, 21A, 21B). In some embodiments, the aperture 620 and cavity 630 are within a ridge 612, and a lower end of the reactor component 640 is within the cavity 630 (FIG. 21A). In an independent embodiment, a lower end of the reactor component 640 extends beyond the cavity 630, e.g., as shown in FIG. 21B. The reactor component may be, for example, a probe, a sensor, a nozzle, a heating or cooling component, a feed line, or a sampling line. Exemplary reactor components include, but are not limited to, a seed nozzle, a thermocouple, a pressure tap, a particle sampling line, a gas sampling line, a gas feed line, a bed height measurement device (e.g., X-ray, gamma, etc.), a force probe, a heat exchanger, a velocity sensor, a spectroscopic probe, a radar probe, or an optical probe.

In view of the many possible embodiments to which the principles of the disclosed invention may be applied, it should be recognized that the illustrated liners and reactors are examples and should not be taken as limiting the scope of the invention. Rather, the scope of the invention is defined by the following claims.

I claim:

1. A reaction chamber liner for use in a fluidized bed reactor for production of polysilicon-coated granulate material, the liner comprising:
    a tubular wall having an upper surface, a lower surface, an outwardly facing surface, an inwardly facing surface configured to define a portion of a reaction chamber, a height $H_W$ between the upper surface and the lower surface, and a thickness $T_W$ between the outwardly facing surface and the inwardly facing surface,
    the tubular wall defining an upper aperture in the upper surface and a cavity that extends from the upper aperture toward the lower surface and that has a depth $D_C$.

2. The reaction chamber liner of claim 1, wherein the depth $D_C$ of the cavity is less than the height $H_W$ of the tubular wall.

3. The reaction chamber liner of claim 1, wherein the depth $D_C$ of the cavity is equal to the height $H_W$ of the tubular wall, and the tubular wall defines a lower aperture such that the cavity extends through the tubular wall from the upper aperture to the lower aperture.

4. The reaction chamber liner of claim 1, wherein the cavity has an inner dimension ID between the outwardly facing surface and the inwardly facing surface of the tubular wall that is smaller than the thickness $T_W$ of the tubular wall, and the cavity is positioned between the outwardly facing surface and the inwardly facing surface of the tubular wall.

5. The reaction chamber liner of claim 1, wherein the inwardly facing surface of the tubular wall defines an inwardly facing lower aperture in fluid communication with the cavity such that the cavity extends from the upper aperture to the inwardly facing aperture.

6. The reaction chamber liner of claim 1, wherein the cavity is dimensioned to receive a reactor component.

7. The reaction chamber liner of claim 6, wherein the reactor component is a seed nozzle, a thermocouple, a pressure tap, a particle sampling line, a gas sampling line, a gas feed line, a bed height measurement device, a force probe, a heat exchanger, a velocity sensor, a spectroscopic probe, a radar probe, or an optical probe.

8. The reaction chamber liner of claim 1, wherein the tubular wall is constructed of silicon carbide, graphite, quartz, silicon nitride, Si- or SiC-coated graphite, carbon fiber, Si- or SiC-coated carbon fiber, or a metal alloy.

9. The reaction chamber liner of claim 1, wherein:
the tubular wall comprises at least one inwardly projecting ridge that is defined by a portion of the inwardly facing surface of the tubular wall and by a corresponding portion of the upper surface, the ridge having a length $L_R$, wherein $L_R \leq H_W$; and
the upper aperture is in the corresponding portion of the upper surface such that the cavity is positioned in the ridge.

10. The reaction chamber liner of claim 9, wherein:
the at least one inwardly projecting ridge is further defined by a corresponding portion of the lower surface of the tubular wall such that $L_R = H_W$;
the tubular wall defines a lower aperture in the corresponding portion of the lower surface; and
the depth $D_C$ of the cavity is equal to the length $L_R$ such that the cavity extends from the upper aperture through the ridge to the lower aperture.

11. The reaction chamber liner of claim 9, wherein $L_R < H_W$, and:
the depth of the cavity $D_C$ is less than the length $L_R$ of the ridge; or
a lower surface of the ridge defines a lower aperture, and the depth of the cavity $D_C$ is equal to the length $L_R$ of the ridge such that the cavity defines a passageway extending from the upper aperture to the lower aperture.

12. The reaction chamber liner of claim 1, wherein:
(i) the reaction chamber liner is a segmented silicon carbide liner comprising a plurality of vertically stacked segments, and the tubular wall is one of the plurality of vertically stacked segments; or
(ii) the tubular wall comprises a plurality of laterally joined segments, and the cavity is in one of the plurality of laterally joined segments; or
(iii) both (i) and (ii).

13. The reaction chamber liner of claim 12, wherein the tubular wall is one of the plurality of vertically stacked segments, and wherein:
(i) the upper surface of the tubular wall comprises one of an upwardly opening depression or an upwardly extending ridge defined by and extending along at least a portion of the upper surface; or
(ii) the lower surface of the tubular wall comprises a downwardly opening depression or a downwardly extending ridge defined by and extending along at least a portion of the lower surface, or
(iii) both (i) and (ii).

14. The reaction chamber liner of claim 13, wherein the lower surface of the tubular wall comprises a downwardly opening depression or a downwardly extending ridge defined by and extending along at least a portion of the lower surface, the liner further comprising:
a second tubular wall located below and abutted to the tubular wall, the second tubular wall having an upper surface defining (a) a upwardly opening second tubular wall depression if the tubular wall lower surface defines an downwardly extending ridge or (b) an upwardly extending second tubular wall ridge if the tubular wall lower surface defines an downwardly opening depression, the ridge being received within the depression and having smaller dimensions than the depression such that the surface of the depression is spaced apart from the surface of the ridge and a space is located between the ridge and the depression.

15. A fluidized bed reactor for production of polysilicon-coated granulate material, the reactor comprising:
a vessel having an outer wall that at least partially defines an enclosed space; and
a reaction chamber liner according to claim 1, the reaction chamber liner being positioned within the enclosed space with the inwardly facing surface of the tubular wall defining at least a portion of a reaction chamber.

16. The fluidized bed reactor of claim 15, further comprising:
at least one heater positioned between the outer wall and the liner;
at least one inlet having an opening positioned to admit a primary gas comprising a silicon-bearing gas into the reaction chamber;
a plurality of fluidization gas inlets, wherein each fluidization gas inlet has an outlet opening into the reaction chamber; and
at least one outlet for removing silicon-coated product particles from the vessel.

17. The fluidized bed reactor of claim 15, further comprising a reactor component located within the cavity of the reaction chamber liner.

18. A reaction chamber liner for use in a fluidized bed reactor for production of polysilicon-coated granulate material, the liner comprising:
a tubular wall having an upper surface, a lower surface, an outwardly facing surface, an inwardly facing surface configured to define a portion of a reaction chamber, and a height $H_W$ between the upper surface and the lower surface of the tubular wall; and
at least one inwardly projecting ridge defined by a portion of the inwardly facing surface, the ridge having an upper surface, a lower surface and a length $L_R$ between the upper and lower surfaces of the ridge, wherein $L_R < H_W$, wherein the upper surface of the ridge is below the upper surface of the tubular wall,
the ridge defining an upper aperture in the upper surface of the ridge and a cavity that extends from the upper aperture into the ridge, the cavity having a depth $D_C$.

19. A fluidized bed reactor for production of polysilicon-coated granulate material, the reactor comprising:

a vessel having an outer wall that at least partially defines an enclosed space; and a reaction chamber liner according to claim 18, the liner being positioned within the enclosed space with the inwardly facing surface of the tubular wall defining at least a portion of a reaction chamber.

20. The fluidized bed reactor of claim 19, further comprising a reactor component located within the cavity of the reaction chamber liner.

* * * * *